(12) United States Patent
Doyle et al.

(10) Patent No.: US 10,799,973 B2
(45) Date of Patent: Oct. 13, 2020

(54) SYSTEMS AND METHODS FOR ADAPTIVE CONTROL OF WIRE PREHEATING

(71) Applicant: Illinois Tool Works Inc., Glenview, IL (US)

(72) Inventors: Brian Doyle, Glenview, IL (US); Shuang Liu, Appleton, WI (US); Erik Miller, Verona, WI (US); Adam E. Anders, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 406 days.

(21) Appl. No.: 15/690,563

(22) Filed: Aug. 30, 2017

(65) Prior Publication Data

US 2019/0061039 A1 Feb. 28, 2019

(51) Int. Cl.
*B23K 9/10* (2006.01)
*B23K 9/12* (2006.01)
*B23K 9/167* (2006.01)
*B23K 9/095* (2006.01)
*B23K 9/173* (2006.01)

(52) U.S. Cl.
CPC .......... *B23K 9/1093* (2013.01); *B23K 9/0953* (2013.01); *B23K 9/0956* (2013.01); *B23K 9/1043* (2013.01); *B23K 9/124* (2013.01); *B23K 9/125* (2013.01); *B23K 9/167* (2013.01); *B23K 9/173* (2013.01)

(58) Field of Classification Search
CPC . B23K 9/095; B23K 9/10; B23K 9/12; B23K 9/173; B23K 9/04; B23K 9/067; B23K 9/0671; B23K 9/28; B23K 9/1093; B23K 9/125; B23K 9/0953; B23K 9/0956; B23K 9/1043; B23K 9/124; B23K 9/167
See application file for complete search history.

(56) References Cited

U.S. PATENT DOCUMENTS

| | | | |
|---|---|---|---|
| 2002/0117489 A1* | 8/2002 | Arndt | B23K 9/0953 219/130.5 |
| 2013/0043219 A1* | 2/2013 | Peters | B23K 35/0261 219/72 |
| 2017/0225255 A1 | 8/2017 | Zwayer et al. | |

* cited by examiner

*Primary Examiner* — Brian W Jennison
(74) *Attorney, Agent, or Firm* — McAndrews, Held & Malloy, Ltd.

(57) ABSTRACT

A welding-type system includes a power supply configured to control preheating of an electrode wire. A controller is configured to receive a plurality of power values corresponding to a power output of the power supply and calculate an arc power value corresponding to an arc condition at the preheated electrode wire based on a rate of change of the plurality of power values. A target power output value is determined based on the calculated arc power value, and the power output is adjusted based on the determined target power value.

18 Claims, 2 Drawing Sheets

SYSTEMS AND METHODS FOR ADAPTIVE CONTROL OF WIRE PREHEATING

BACKGROUND

Welding is a process that has proven to be a cost effective joining method. Welding is, at its core, simply a way of bonding two pieces of parent material. Laser welding is a welding technique used to join pieces of metal through the use of a laser. The beam provides a concentrated heat source, enabling a precise control of the heat input and high welding speed, creating a weld with low heat input, and a small heat affected zone.

In various applications, filler metal may be needed for different purposes such as filling the gap, reinforcing the joint, overlaying the substrate surface, building up an object, or acting as a buffering medium. The filler material can be brought into the molten pool, either by pre-deposited layer or by feeding powder or wire to the molten pool. Wire feeders offers several advantages, including near total material utilization, good out-of-position tolerance, high deposition rate, cleaner work environment, safer operations, and low material costs. In some examples, the wire is provided by the welding tool and melted by power focused at the workpiece, in other words, a cold wire. In other examples, the wire is preheated to increase the temperature of the wire before application to the workpiece.

Welding with a heated wire can enhance the stability and productivity of the deposition process. For example, preheating the wire can additionally release casting force on the wire, which softens the wire to reduce the recoiling force against the wire and the welding torch. However, an arc condition can occur with the use of a preheating device. Laser energy can be used to melt a substrate surface to form a metallurgical bond. Laser welding technique utilizing preheated wire, or "hot-wire," results in the overall more efficient use of energy and it increases the deposition rate, which can be as much as three times higher than with cold wire or powder.

A system that incorporates the benefits of preheated wire and laser welding technology, while mitigating the possibility of an arc condition, is therefore desirable.

BRIEF SUMMARY

This disclosure relates generally to wire preheating systems, methods, and apparatuses for use with a laser welding process. More particularly, this disclosure relates to a laser welding-type system to use a preheated electrode wire to perform welding-type operations. The system monitors and/or measures a plurality of values associated with the preheated wire (e.g., temperature, voltage, current, resistance, impedance, change in enthalpy, etc.). Based on the measured values, the system can identify and/or calculate at which point an arc condition may occur. The corresponding values can be stored in a memory and used to compare against measured values during a welding-type operation. If a measured value reaches, or even trends toward, one or more values associated with an arc condition, the system can adjust one or more values (e.g., a power output to heat the wire, a wire feed speed, etc.) to mitigate the occurrence of an arc condition during a welding-type operation.

In examples, a welding-type system includes a power supply configured to preheat an electrode wire. A controller associated with the system is configured to receive a plurality of power values corresponding to a power output of the power supply. The controller calculates an arc power value corresponding to an arc condition at the preheated electrode wire based on a rate of change of the plurality of power values. A target power output value is determined based on the calculated arc power value. Based on the determined target power value, the controller then adjusts the power output.

In some examples, the power output is regulated between a high threshold value and a low threshold value about the target power output level. The controller is configured to compare a first power value of the plurality of power values to the high threshold power value and the low threshold power value and adjust the power output based on the comparison.

The controller is also configured to raise the power output if the first power output is below the low threshold power value and to lower the power output if the first power output is above the high threshold power value. The system includes a wire feeder, where the controller can adjust a wire feed speed based on a comparison of the first power value to the target power output and the high and low threshold values. In some examples, an arc condition occurs when at least a portion of an electrical current is taking a path that includes an electric arc.

In examples, the controller is configured to access a memory device that includes a plurality of arc power values that associates a rate of change of the plurality of power values with corresponding arc conditions and identify the arc power value corresponding to an arc condition based on the rate of change of the plurality of power values.

The controller can interpolate the target power output value based on a rate of change of the plurality of power values associated with a corresponding arc condition value stored in the memory device; and select corresponding high and low threshold power values based on the interpolated target power output value. In examples, the plurality of power values comprises a voltage, a current, a resistance, an enthalpy, or a combination thereof. Further, the controller can determine a change in enthalpy values associated with the electrode wire; and adjust the power output based in part on a comparison of a measured change in enthalpy values with a stored change in enthalpy values associated with an arc condition.

In another example, a welding-type system includes a power supply configured to resistively preheat an electrode wire. A wire feeder to drive the preheated electrode wire for a welding-type operation at a first wire feed speed. A sensor configured to monitor a change in enthalpy associated with the preheated electrode wire. Further, a controller receives a signal from the sensor corresponding to an arc condition at the preheated electrode wire, determines a change in an enthalpy value at which the arc condition at the preheated electrode wire occurs based on the signal and the first wire feed speed, and adjusts the wire feed speed based on the determined change in the enthalpy value.

A sensor measures voltage, temperature, current, resistance, impedance, or a combination thereof. The controller is configured to adjust the power output of the power supply based on the enthalpy value and to adjust the power output of the power supply by a predetermined percentage of the power output. The controller adjusts the wire feed speed until the controller receives a signal from the sensor indicating the arc condition is no longer detected. The controller can also adjust the wire feed speed by a predetermined percentage of the wire feed speed.

In yet another example, a method includes controlling, via a controller of a power supply, a power output to preheat an electrode wire, receiving, at the controller, a signal value corresponding to an arc condition at the preheated electrode wire, identifying, by the controller, an arc power value corresponding to the arc condition, and adjusting, by the controller, the power output to the preheated electrode wire by a predetermined interval below the arc power value.

The method can also include accessing a memory device that includes a plurality of arc power values that associates a rate of change of the plurality of power values with corresponding rate of change in arc enthalpy values, and identifying a rate of change in arc enthalpy values corresponding to an arc condition based on the rate of change of the plurality of power values.

In some examples, the method stores the signal value corresponding to the arc condition and the arc power value in a memory device that includes a plurality of values that associates signal values with corresponding arc enthalpy values. Additionally, the method calculates a threshold power value based on the rate of change in arc enthalpy values. In some examples, the arc condition occurs when at least a portion of the electrical current is taking a path that includes an electric arc.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1:
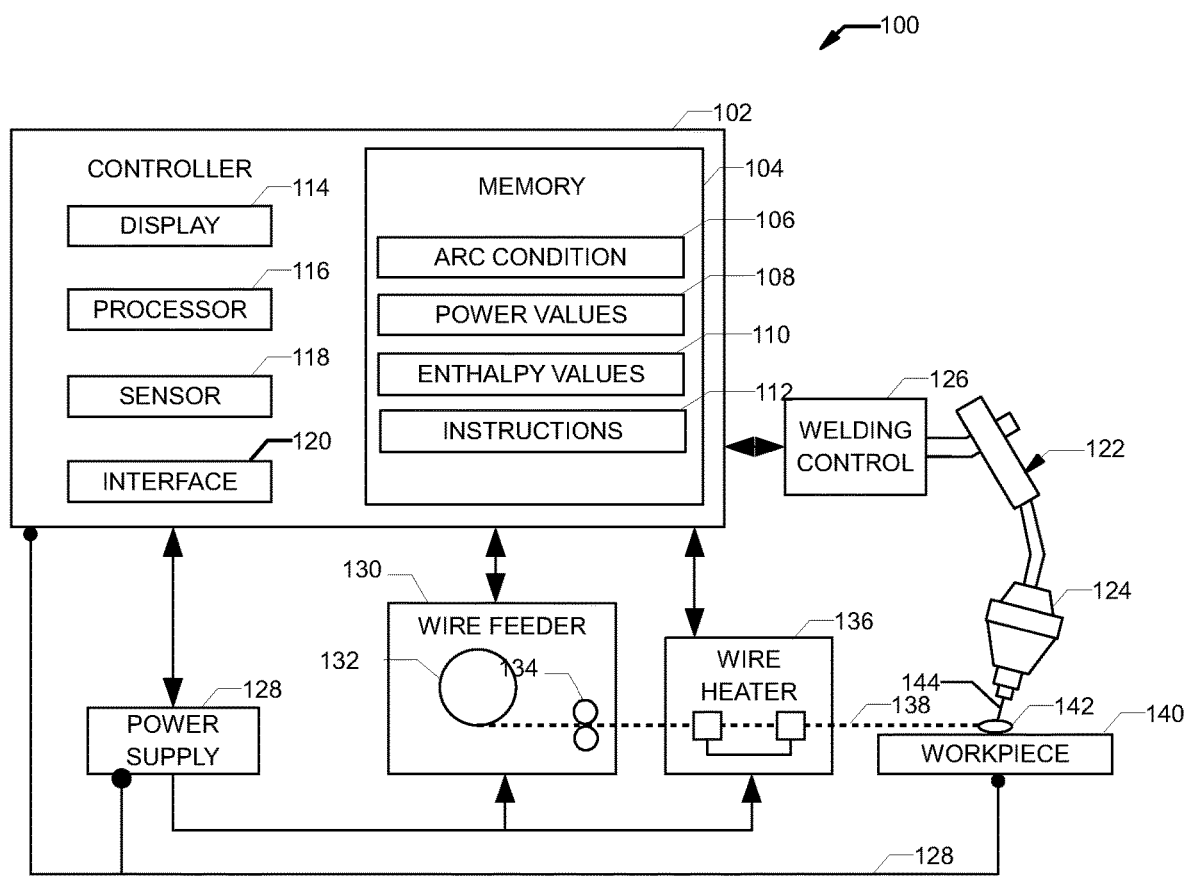
FIG. 1 illustrates an example laser welding system, in accordance with aspects of this disclosure.

The present disclosure relates to a laser welding system that employs a continuously fed, preheated electrode wire while mitigating the occurrence of an arc condition. In particular, the wire is resistively preheated (e.g., to a temperature just below the melting temperature of the wire) and then fed into a weld pool created by a high density energy beam. The system is configured to monitor a plurality of power values and calculate when an arc condition will occur. The system is configured to store and update power values corresponding to the arc condition. In this manner, the system is capable of identifying when an arc condition may occur based on historical information, and adjust a characteristic of the system to prevent the occurrence of an arc condition.

Example systems and methods disclosed herein employ the laser welding system to generate and focus a laser beam (i.e. one or more) onto a focal point location on a workpiece. The focal point corresponds to a contact point of the electrode wire where a weld puddle is being formed. For example, power from the laser beam(s), along with the preheat energy is used to melt the electrode wire during a welding operation. The power required from the laser beam to melt the electrode is determined at least in part by the level of preheating of the electrode wire.

In conventional systems, a user selects a wire feed speed, and then is required to input the corresponding power output values for a particular welding operation. If the power output to the associated wire heater is too high, an arc condition can occur. Additionally or alternatively, the welding operation may result in a stub wire if the power output is too low.

The welding system described herein is capable of measuring a plurality of power values (e.g., a voltage, a current, a resistance, an impedance, enthalpy, temperature, etc.) during one or more welding operations, and calculate one or more threshold output values that correspond to an arc condition. The system records the output values and calculated threshold output values, and adjusts or regulates the system output to avoid an arc condition. The controller is further capable of recording power output values associated with each welding operation, and to compensate for changes in the system identified during operation, such as contact tip wear, etc.

In contrast to conventional devices, the welding system described herein does not require a user to identify and set a power output value (e.g., current, voltage, enthalpy value, temperature, etc.) corresponding to a target power output value or regulation point. In particular, the current welding system is configured to detect whether an arc condition is present or not, and adjust accordingly. The system is configured to adjust a power output and measure one or more characteristics of the output, to identify a threshold value at which the arc condition occurs. The system will then regulate the power output based on the measurements.

In some examples, a user is able to adjust and/or override the desired output level, or regulation point, based on the measured output values corresponding to an identified arc condition. Further, the current welding system "learns" which power output values correspond to the regulation point and updates the stored values based on feedback information.

Advantageously, the system is capable of operating with any wire type, yet does not require a separate weld schedule for different types. Further, the preheating threshold can be optimized based on historical information, including power output parameters, welding wire type, wire feed speed, etc. The system is also configured to adapt to changes in the welding process, such as contact tip wear, as described herein.

Preheating the electrode wire enables the system to increase the deposition rate during a welding process in comparison to a cold wire system, as well as reducing the required lasing power to form a weld. Further, the preheating method on the wire is independent of the substrate or molten pool conditions, delivering a very stable process.

For the purpose of promoting an understanding of the principles of the claimed technology and presenting its currently understood best mode of operation, reference will be now made to the examples illustrated in the drawings, and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As used herein, the word "exemplary" means serving as an example, instance, or illustration. The examples described herein are not limiting, but rather are exemplary only. It should be understood that the described examples are not necessarily to be construed as preferred or advantageous over other examples. Moreover, the term "examples" does not require that all examples of the disclosure include the discussed feature, advantage, or mode of operation.

As used herein, a wire-fed welding-type system refers to a system capable of performing welding (e.g., gas metal arc welding (GMAW), gas tungsten arc welding (GTAW), etc.), brazing, cladding, hardfacing, and/or other processes, in which a filler metal is provided by a wire that is fed to a work location, such as an arc or weld puddle.

As used herein, a welding-type power supply refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

FIG. 1 illustrates a functional diagram of an example laser welding system 100, which employs a laser welding control 126 to control a laser welder 122 to perform a welding process via a laser welding torch 124. A continuously fed electrode wire 138 is driven to a workpiece 140 by a wire feeder 130, and preheated by a wire heater 136. A power supply 128 can provide power to the wire feeder 130, the wire heater 136, and the laser welder 122. Additionally or alternatively, the laser welder 122 can be powered by another power supply to provide lasing power for the wire 138.

As shown, wire feeder 130 includes a reel 132 to hold a roll of electrode wire 138. Rollers 134 drive the wire 138 from the reel 132 to the workpiece 140. The laser welder 122 provides laser power 144 focused on a location of the workpiece 140 to create a pool of molten material 142 (e.g., a puddle). As the wire 138 is introduced to the puddle 142, the wire 138 melts and is used in the welding process (e.g., additive manufacturing, welding and/or brazing). In some welding environments, the workpiece 140 is configured to connect with the power supply 128 via a return cable (e.g., a ground cable, via an arc sensing clamp, etc.).

In examples, the wire heater 136 is configured to pass a current through a portion of the wire 138 to resistively heat the wire 138, raising a heat value (e.g., enthalpy, temperature, etc.) of the wire 138. In this manner, the wire 138 is preheated before making contact with the workpiece 140. The amount of lasing power required to melt the preheated wire 138 (e.g., via the puddle) is therefore reduced.

The system 100 includes a controller 102 to govern the function of the system 100. For example, the controller 102 can send and receive information to and from power supply 128, the wire feeder 130, the wire heater 136, as well as the welding control 126 of the laser welder 122. The controller 102 is configured to connect to a welding type tool, such as laser welding torch 124, via a cable and/or control arm to transmit power, send and/or receive information, and/or control movement of the laser welder 122.

The controller 102 can include one or more components, for example, a display 114, a processor 116, a sensor 118, an interface 120, and a memory 104. The memory 104 can include a set of instructions 112 to guide the controller 102, as well as one or more registers of values (e.g., lists, matrices, etc.), such as arc condition values 106, power values 108, and enthalpy values 110.

The sensor 118 (e.g. one or more sensors) can monitor and/or measure one or more characteristics of the system 100. In some examples, the sensor 118 monitors an output of the wire heater 136 (e.g., heat, enthalpy, current, voltage, etc.) as well as a wire feed speed from the wire feeder 132. The sensor 118 can be configured to provide acquired information to the controller 102, which can adjust one or more variables of the system 100 in response, as described herein.

In the example welding system 100, the sensor(s) 118 can be configured to measure values associated with a power output of the wire heater 138, such as preheat current, preheat power, preheat enthalpy or heat content, and/or preheat circuit impedance. The controller 102 monitors heating anomalies by comparing the measured value(s) to desired value(s), by evaluating the time derivatives and/or integrals of the measured value(s), and/or by statistical analysis (e.g., means, standard deviations, root-mean-squared (RMS) values, minimum, maximum, etc.).

During a welding process, however, an arc conditions can occur along the wire feed path. An arc condition occurs when at least a portion of the electrical current is taking a path that includes an electric arc. For example, an arc condition can occur at the preheated wire 138 is severed or otherwise compromised along the wire feed path (e.g., damage to the wire 138), such that an arc occurs Under some circumstances, an arc condition can occur due to a preheating power output being too high for the particular welding process. For example, for a particular welding process and environment, a power output value (e.g., a voltage, a current, a resistance, an impedance, enthalpy, temperature, etc.) of the preheating device should be set to an appropriate level for the particular operation. However, changes in the welding process (e.g., a change in the wire feed speed, etc.) may upset the balance between the variables of a welding process.

To avoid a change in one or more of the variables resulting in an arc condition, the system 100 is configured to update the lists of values 106-110 (e.g., matrix, register, etc.) associating arc conditions to power output variables and wire feed speeds. The system 100 calculates and/or identifies when an arc condition is occurring or will occur based on a comparison of measured and stored values. Based on the comparison of preheating power output values and/or wire feed speed, a target power output value, or regulation point, can be identified and a preheating power output value and/or wire feed speed can be adjusted based on the target power output value to mitigate an active or predicted arc condition. For example, if an arc condition is identified, the controller 102 can lower the power output, such as by a predetermined amount or percentage.

As described herein, an arc condition can be predicted by measuring a rate of change of a power output value (e.g., a voltage, a current, a resistance, an impedance, enthalpy, temperature, etc.) or other characteristic of the system 100. Based on the rate of change, the controller 102 can adjust a parameter of the system 100, such as preheating power, wire feed speed, etc. In an example, a feedback signal can represent a change in a measured parameter (e.g., voltage) between a contact tip and the workpiece 140.

In some examples, the controller 102 can perform a calibration routine, by raising power output values until an arc condition occurs (e.g., a spike in voltage is detected) or to a point when the measured values predict an arc condition will occur. Thus, the controller 102 can identify a target output power value based on information associated with an arc condition, and store the values that correspond to the arc condition in the memory 104 for future reference.

In examples, an arc clamp can be employed to identify an arc condition. For instance, an arc clamp may be configured to start conducting current when an arc occurs, or shortly before an arc occurs. The current can be measured and the information sent to the controller 102, which can identify the power output values associated with the arc condition, as described herein.

Additionally or alternatively, the controller 102 can identify a gradual change in the power output values that corresponds to a decay of the wire (e.g., associated with contact tip wear), which could result in an arc condition. The controller 1102 can identify the rate in change and increase output power to compensate (e.g., by a predetermined amount, a percentage, etc.).

In an example, the sensor(s) 118 is an enthalpy measurement circuit configured to determine a change in enthalpy associated with the wire 138. The example measurement circuit may determine the change in enthalpy based on a measured preheating current and/or voltage, and/or the voltage drop across the preheated portion of the electrode. The controller 102 receives a signal from the sensor 118 and controls the preheating current from wire heater 138 based on the determined change in enthalpy values and a target enthalpy value to be applied to the wire 138.

In some examples, the controller 102 controls the preheat power level and the welding laser power level based on the target power output value, and modifies the welding laser power level in response to changes in the preheat level by the user. Additionally or alternatively, the preheat level and/or the welding laser power level may be specified by the user in terms of a target heat input, a target preheating power level, and/or a target ratio between the preheating power and the welding-type laser power.

The system 100 can include a user interface 120 connected to the controller 102. The user interface 120 enables a user of the welding system 130 to adjust a preheating level or provide additional or alternative instructions associated with a preheating level (e.g., a welding type process, a wire feed speed, an electrode type, etc.). The controller 102 receives instructions (e.g., a preheat level or penetration level) selected via the interface 120 and controls the power supply 128 to change the preheat level. The controller 102 may further control the system 100 to adjust one or more aspects of the laser welding power based on the preheat level selected to improve performance at the selected preheat level. The controller 102 is configured to control the preheating power based on at least one of a target total heat input for a weld, a travel speed, a target bead width, or a target penetration depth, for example.

The controller 102 controls the system 100 using a preheat control loop which uses the voltage sensed via the arc sensing clamp and the current output by the system 100 to maintain a commanded power input, current input, voltage input, enthalpy, and/or impedance to the electrode wire 112. In some examples, the preheat control loop uses an error between a commanded preheat voltage and the voltage sensed via the clamp to identify the target power output level and to adjust the preheat current, the preheat voltage, and/or the preheat power.

In some examples, additional and/or alternative preheating devices can be employed. In some examples the preheating device can be located along a wire feed path to the processing head (e.g., near a wire feeder). In other examples, the preheating device can be integrated with a processing head of the laser welding system. For example, the wire heater can be included within the processing head of the laser welding system or at another location along a wire feed path to resistively heat the wire 112.

The laser welding system 100 can be an example robot, such as the illustrated bent-neck (i.e., gooseneck design) welding torch (or, when under manual control, a handheld torch), to which power is delivered by a power supply. In some examples, the welding laser 122 can generate lasing power as a constant, continuous laser beam. Additionally or alternatively, welding laser 122 generates a pulsed laser beam and/or any other desired lasing profile. In some examples, the welding-type system 100 is configured to perform additive manufacturing, welding and/or brazing operations.

The controller 102 receives input from the user interface 120, through which a user may choose a process and/or input desired parameters (e.g., voltages, currents, particular pulsed or non-pulsed welding regimes, preheat energy or power, and so forth). The user interface 120 may receive inputs using any input device, such as via a keypad, keyboard, buttons, knobs, touch screen, voice activation system, wireless device, a remote processor, etc. Furthermore, the controller 102 controls operating parameters based on input by the user as well as based on other current operating parameters. Specifically, the user interface 120 may include a display 150 for presenting, showing, or indicating, information to an operator. The controller 102 may also include communications circuitry for communicating data to other devices in the system, such as the wire feeder 134. For example, in some situations, the power supply 128 wirelessly communicates with other welding devices within the welding system. Further, in some situations, the power supply 128 communicates with other welding devices using a wired connection.

The controller 102 includes at least one controller or processor 116 that controls the operations of the laser welding system 100. The controller 102 receives and processes multiple inputs associated with the performance and demands of the system. The processor 116 may include one or more microprocessors, such as one or more "general-purpose" microprocessors, one or more special-purpose microprocessors and/or ASICS, FPGA's, and/or any other type of processing device. For example, the processor 116 may include one or more digital signal processors (DSPs).

The memory device 104 may include a volatile memory, such as random access memory (RAM), and/or a nonvolatile memory, such as read-only memory (ROM), flash memory, a hard drive, and/or any other suitable optical, magnetic, and/or solid-state storage medium, and/or a combination thereof. The memory device 104 may store a variety of information and may be used for various purposes. For example, the memory device 104 may store processor executable instructions 112 (e.g., firmware or software) for the processor 116 to execute. In addition, one or more control regimes for various welding processes, along with associated settings and parameters, may be stored in the memory device 104, along with code configured to provide a specific output (e.g., initiate wire feed, enable gas flow, capture welding current data, detect short circuit parameters, determine amount of spatter) or to regulate a specific operating parameter (e.g., a voltage, a current, a change in enthalpy, welding device settings, etc.) during operation.

Figure 2:
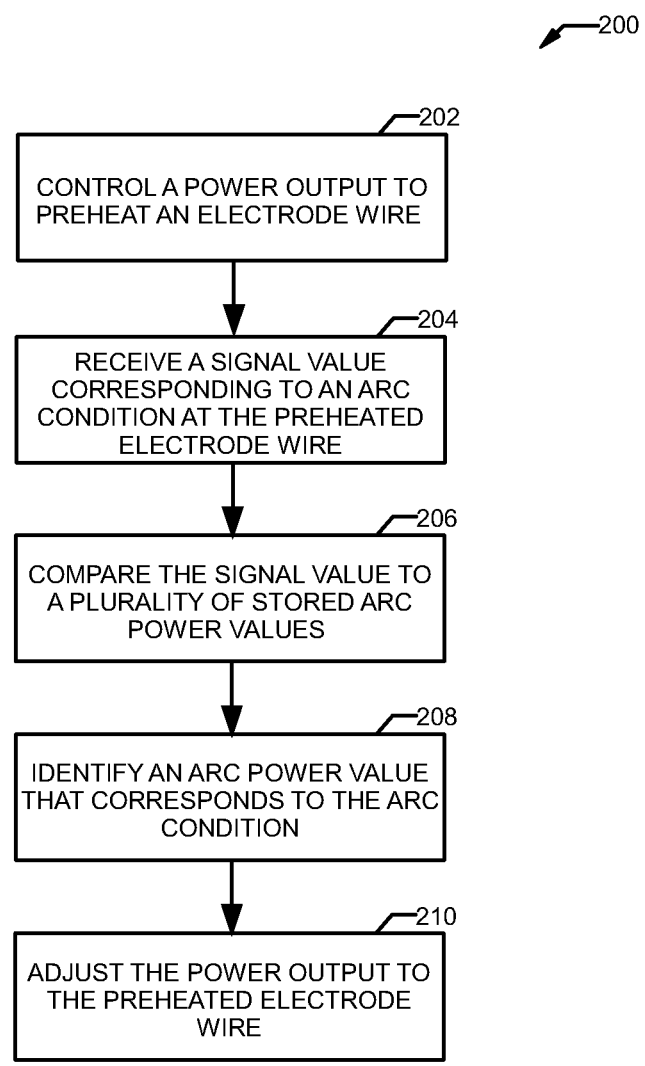
FIG. 2 is a flowchart representative of example method employing the laser welding system of FIG. 1, in accordance with aspects of this disclosure.

FIG. 2 is a flowchart representative of example method 200, such as implemented as machine readable instructions 112, which may be executed by the controller 102 to control welding operations and/or preheating of a welding electrode wire 138. The example method 200 is described below with reference to the FIG. 1.

At block 202, a controller (e.g., controller 102) associated with a power supply (e.g., power supply 128) controls a power output (e.g., to wire heater 136) to preheat an electrode wire (e.g., electrode wire 138). At block 204, the controller receives a signal value corresponding to an arc condition at the preheated electrode wire. At block 206, the controller compares the signal value to a plurality of stored arc power values (e.g., power values 108, enthalpy values 110) corresponding to arc conditions (e.g., arc condition values 106). At block 208, the controller identifies an arc power value that corresponds to the arc condition.

At block 210, the controller adjusts the power output to the preheated electrode wire. The amount of the adjustment can be determined by the controller, such as based on a calculation, or by a predetermined interval (e.g., percentage) below the identified arc power value.

The laser welding system described herein provides a number of advantages. In employing the described systems, apparatuses and methods, the possibility of a fault from an arc condition resulting from the resistive preheating device is mitigated.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:
   a power supply configured to preheat an electrode wire; and
   a controller configured to:
      receive a plurality of power values corresponding to a power output of the power supply;
      calculate an arc power value corresponding to an arc condition at the preheated electrode wire based on a rate of change of the plurality of power values;
      determine a target power output value based on the calculated arc power value;
      adjust the power output based on the determined target power value;
      determine a change in enthalpy values associated with the electrode wire; and
      adjust the power output based in part on a comparison of a measured change in enthalpy values with a stored change in enthalpy values associated with an arc condition.

2. The system as defined in claim 1, wherein the power output is regulated between a high threshold value and a low threshold value about the target power output value.

3. The system as defined in claim 2, wherein the controller is configured to:
   compare a first power value of the plurality of power values to the high threshold power value and the low threshold power value; and
   adjust the power output based on the comparison.

4. The system as defined in claim 2, wherein the controller is configured to:
   raise the power output if the first power output is below the low threshold power value; and
   to lower the power output if the first power output is above the high threshold power value.

5. The system as defined in claim 2, further comprising a wire feeder, the controller further configured to adjust a wire feed speed based on a comparison of the first power value to the target power output value and the high and low threshold values.

6. The system as defined in claim 1, wherein the arc condition occurs when at least a portion of an electrical current is taking a path that includes an electric arc.

7. The system as defined in claim 1, wherein the controller is configured to:
   access a memory device that includes a plurality of arc power values that associates a rate of change of the plurality of power values with corresponding arc conditions; and
   identify the arc power value corresponding to an arc condition based on the rate of change of the plurality of power values.

8. The system as defined in claim 1, wherein the controller is configured to:
   interpolate the target power output value based on a rate of change of the plurality of power values associated with a corresponding arc condition value stored in a memory device; and
   select corresponding high and low threshold power values based on the interpolated target power output value.

9. The system as defined in claim 1, wherein the plurality of power values comprises a voltage, a current, a resistance, an enthalpy, or a combination thereof.

10. A welding-type system, comprising:
    a power supply configured to resistively preheat an electrode wire;
    a wire feeder to drive the preheated electrode wire for a welding-type operation at a first wire feed speed;
    a sensor configured to monitor a change in enthalpy associated with the preheated electrode wire; and
    a controller configured to:

receive a signal from the sensor corresponding to an arc condition at the preheated electrode wire;

determine a change in an enthalpy value at which the arc condition at the preheated electrode wire occurs based on the signal and the first wire feed speed; and adjust the wire feed speed based on the determined change in the enthalpy value.

11. The system as defined in claim 10, further comprising a sensor configured to measure voltage, temperature, current, resistance, impedance, or a combination thereof.

12. The system as defined in claim 10, wherein the controller is further configured to adjust the power output of the power supply based on the enthalpy value.

13. The system as defined in claim 12, wherein the controller is further configured to adjust the power output of the power supply by a predetermined percentage of the power output.

14. The system as defined in claim 10, wherein the controller is further configured to adjust the wire feed speed until the controller receives a signal from the sensor indicating the arc condition is no longer detected.

15. The system as defined in claim 14, wherein the controller is further configured to adjust the wire feed speed by a predetermined percentage of the wire feed speed.

16. A method, comprising:

controlling, via a controller of a power supply, a power output to preheat an electrode wire;

receiving, at the controller, a signal value corresponding to an arc condition at the preheated electrode wire;

identifying, by the controller, an arc power value corresponding to the arc condition;

adjusting, by the controller, the power output to the preheated electrode wire by a predetermined interval below the arc power value;

accessing a memory device that includes a plurality of arc power values that associates a rate of change of the plurality of power values with corresponding rate of change in arc enthalpy values;

identifying a rate of change in arc enthalpy values corresponding to an arc condition based on the rate of change of the plurality of power values; and storing the signal value corresponding to the arc condition and the arc power value in a memory device that includes a plurality of values that associates signal values with corresponding arc enthalpy values.

17. The method as defined in claim 16, further comprising calculating a threshold power value based on the rate of change in arc enthalpy values.

18. The method as defined in claim 16, wherein the arc condition occurs when at least a portion of the electrical current is taking a path that includes an electric arc.

* * * * *